US011115825B2

(12) United States Patent
Ishida et al.

(10) Patent No.: US 11,115,825 B2
(45) Date of Patent: Sep. 7, 2021

(54) CONNECTION CONTROL SYSTEM, CONNECTION CONTROL METHOD AND MANAGEMENT SERVER

(71) Applicant: NTT DOCOMO, INC., Tokyo (JP)

(72) Inventors: Kuniomi Ishida, Tokyo (JP); Naoyuki Nakao, Tokyo (JP); Miho Kikkawa, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 64 days.

(21) Appl. No.: 16/497,980

(22) PCT Filed: Oct. 17, 2017

(86) PCT No.: PCT/JP2017/037566
§ 371 (c)(1),
(2) Date: Sep. 26, 2019

(87) PCT Pub. No.: WO2018/179537
PCT Pub. Date: Oct. 4, 2018

(65) Prior Publication Data
US 2021/0112419 A1     Apr. 15, 2021

(30) Foreign Application Priority Data

Mar. 29, 2017   (JP) .............................. JP2017-065871

(51) Int. Cl.
*H04W 12/00*       (2021.01)
*H04W 12/71*       (2021.01)
(Continued)

(52) U.S. Cl.
CPC ......... *H04W 12/71* (2021.01); *H04L 12/1464* (2013.01); *H04M 15/84* (2013.01);
(Continued)

(58) Field of Classification Search
CPC ..... H04W 12/71; H04W 12/35; H04W 76/11; H04L 12/1464; H04M 15/84; H04M 15/852
See application file for complete search history.

(56) References Cited

U.S. PATENT DOCUMENTS

2012/0282924 A1*  11/2012  Tagg ..................... H04W 48/18
                                                    455/432.1
2014/0007200 A1*  1/2014  Zisimopoulos ....... H04L 63/102
                                                    726/4
(Continued)

FOREIGN PATENT DOCUMENTS

CN       101267631 B   * 11/2011
JP       2012529789 A    11/2012
(Continued)

OTHER PUBLICATIONS

Extended European Search Report issued in the counterpart European Patent Application No. 179031745, dated Aug. 12, 2019 (9 pages).
(Continued)

*Primary Examiner* — Khai M Nguyen
(74) *Attorney, Agent, or Firm* — Osha Bergman Watanabe & Burton LLP (57) ABSTRACT

According to the present invention, when receiving a connection request including an SIM-ID from a terminal 20, a connection node 16 connects the terminal to a connection destination APN which is associated with the SIM-ID. A user management server 10 and an SIM-ID management server change the connection destination APN associated with the SIM-ID according to a change in a use state of a prepaid SIM, and distributes, to the connection node 16, an association relationship between the SIM-ID and the connection destination APN. By this process, the connection
(Continued)

destination APN of a terminal connected to a network can be automatically switched according to a change in an identifier use state of the prepaid SIM.

9 Claims, 8 Drawing Sheets

(51) Int. Cl.
    *H04W 76/11*    (2018.01)
    *H04W 12/30*    (2021.01)
    *H04L 12/14*    (2006.01)
    *H04M 15/00*    (2006.01)

(52) U.S. Cl.
    CPC ......... *H04M 15/852* (2013.01); *H04W 12/35* (2021.01); *H04W 76/11* (2018.02)

(56) References Cited

U.S. PATENT DOCUMENTS

2015/0359026 A1   12/2015   Iwai et al.
2019/0357124 A1*   11/2019   Jia .......................... H04W 8/18

FOREIGN PATENT DOCUMENTS

| | | | |
|---|---|---|---|
| JP | 2013021453 | A | 1/2013 |
| JP | 2013526106 | A | 6/2013 |
| JP | 2015522976 | A | 8/2015 |
| JP | 2016189538 | A * | 11/2016 |
| WO | 2014097517 | A1 | 6/2014 |
| WO | 2015133640 | A1 | 9/2015 |

OTHER PUBLICATIONS

International Search Report issued in International Application No. PCT/JP2017/037566, dated Jan. 16, 2018 (5 pages).
Written Opinion issued in International Application No. PCT/JP2017/037566; dated Jan. 16, 2018 (5 pages).
Office Action issued in the counterpart Chinese Patent Application No. 201780089271.0, dated Aug. 5, 2020 (19 pages).

* cited by examiner

| PARTNER MANAGEMENT TABLE ||
|---|---|
| PARTNER CODE | APN CONVERSION FLAG VALUE |
| AAA | APN#1 |
| BBB | APN#2 |

| PARTNER MANAGEMENT TABLE | | |
|---|---|---|
| PARTNER CODE | APN CONVERSION FLAG VALUE | VALIDITY CONDITION |
| AAA | APN#1 | 15 DAYS |
| BBB | APN#2 | UP TO 10 GB |

CONNECTION CONTROL SYSTEM, CONNECTION CONTROL METHOD AND MANAGEMENT SERVER

TECHNICAL FIELD

The present invention relates to a connection control system, a connection control method, and a management server for controlling connection destinations of terminals.

BACKGROUND ART

In a mobile communication network, connection processing using APN information indicating APN (Access Point Name) of the connection destination is performed. The APN information may be configured in advance in the terminal, or may be configured in the terminal by its user. The terminal transmits a connection request including the APN information to a connection node. The connection node performs the connection processing for the APN indicated by the APN information included in the connection request received from the terminal.

Recently, there has been a spread of prepaid SIMs (Subscriber Identity Modules) designed to be used for a short term in mobile communication terminals. The purpose of using the prepaid SIM varies depending on the users, so that the APN as the connection destination needs to be changed as necessary. However, it is a great load and lacks convenience for the user to configure new APN information in the terminal every time the APN as the connection destination changes. Therefore, in order to increase the convenience further, considered is a method with which the APN as the connection destination is selected and controlled on a network side without having the user configure the APN as the connection destination.

PTL 1 discloses a technique in which a terminal is connected to an APN associated with a user state based on a user identifier without depending on APN information transmitted from the terminal, once a connection node (communication control apparatus) receives a connection request including the user identifier and the APN information from the terminal.

CITATION LIST

Patent Literature

PTL 1 Japanese Patent Application Laid-Open No. 2013-21453

SUMMARY OF INVENTION

Technical Problem

Taking the usage of the prepaid SIM into consideration, it is desired to be able to select the APN as the connection destination more flexibly in order to open a subscribed line after the user physically acquires the prepaid SIM or in order to provide communication services in cooperation with the services, campaigns, or the like provided by other companies than a communications carrier.

An object of the present invention is to provide a connection control system, a connection method, and a management server, which are capable of automatically switching an APN as a connection destination of a terminal being connected to a network in accordance with a change in a use state of a SIM.

Solution to Problem

A connection control system according to one aspect of the present invention includes: a connection node configured to connect, upon receipt of a connection request including an identifier of a SIM (Subscriber Identity Module) from a terminal, the terminal to an APN (Access Point Name) as a connection destination associated with the identifier of the SIM; and a management server configured to change the APN as the connection destination associated with the identifier of the SIM in accordance with a change in a use state of the SIM, and deliver an association between the identifier of the SIM and the APN as the connection destination to the connection node.

Advantageous Effects of Invention

With the present invention, the APN as the connection destination of the terminal being connected to the network can be automatically switched in accordance with the change in the use state of the identifier of the SIM.

DESCRIPTION OF EMBODIMENTS

Hereinafter, an embodiment of the present invention will be described with reference to the accompanying drawings. Note that configuration elements (including element steps and the like) in the embodiment hereinafter are not essential except for a case stated so explicitly, a case considered clearly essential theoretically, and the like.

<Configuration of Connection Control System>

Figure 1:
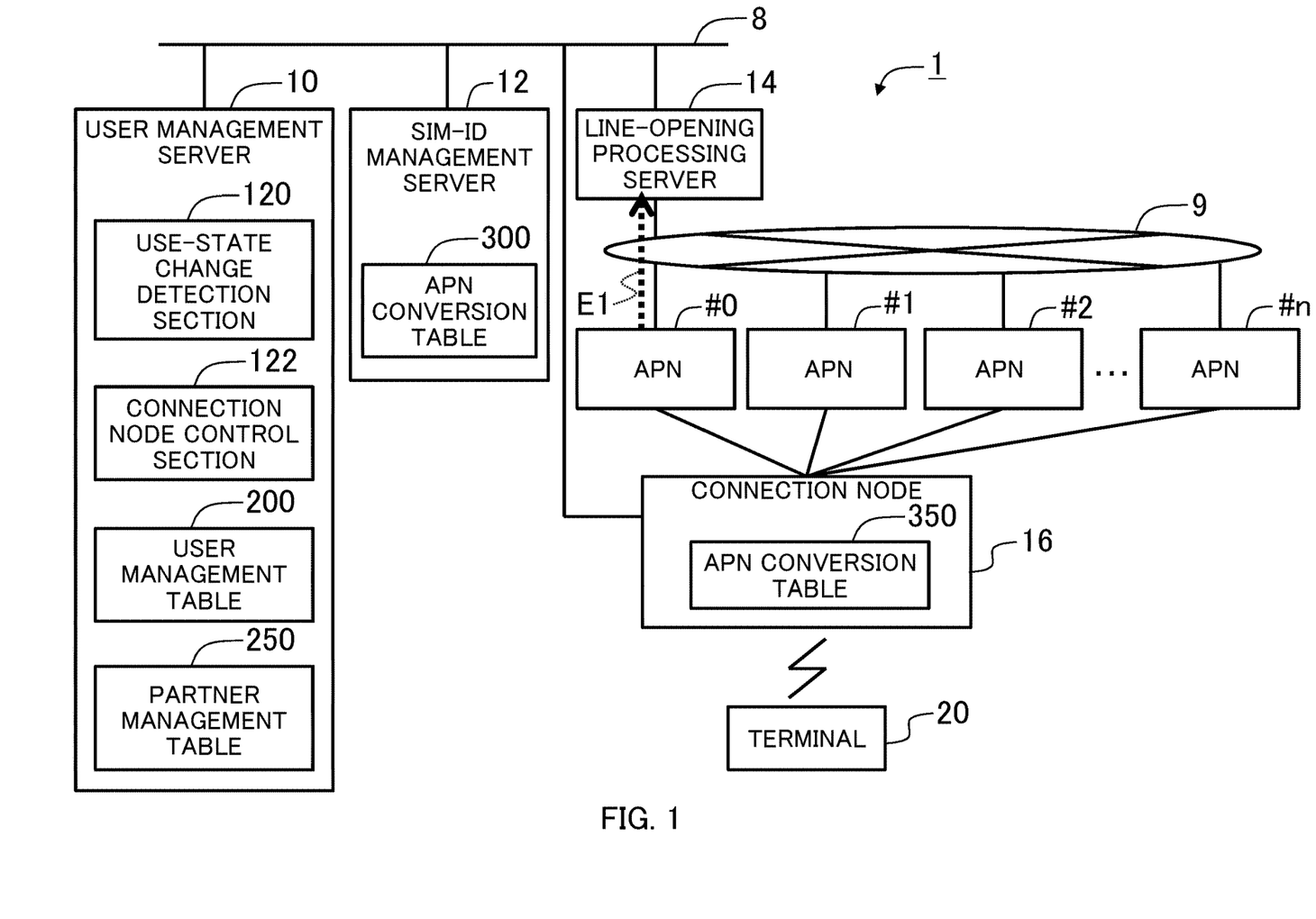
FIG. 1 is a block diagram illustrating an exemplary configuration of a connection control system according to an embodiment.

FIG. 1 is a block diagram illustrating an exemplary configuration of connection control system 1 according to the embodiment. Connection control system 1 includes user management server 10, SIM-ID (identification) management server 12, line-opening processing server 14, connection node 16, and APN #0 to #n (n is an integer of 1 or larger).

User management server 10, SIM-ID management server 12, the line-opening processing server 14, and connection node 16 are connected mutually via communication network 8.

APN #0 to #n are physical or logical nodes to be the connection destinations of terminal 20, and each of those is connected to connection node 16. APN #0 is a special APN that logically limits access destination from terminal 20 to line-opening processing server 14 as indicated by arrow E1 of FIG. 1. Each of APN #1 to #n is assigned to partner companies by a communications carrier, and a peculiar condition is configured. Each of APN #1 to #n controls access from terminal 20 to network 9 based on the configured peculiar condition. Details of the peculiar condition will be described later. Note, however, that APN #1 to APN #n are not limited only to those providing the peculiar condition but may also be typical APNs.

Note that GGSN (Gateway GPRS Support Node)/P-GW (PDN (Packet data network) Gateway) may be disposed between each APN and connection node 16. Further, connection node 16 may be SGSN (Serving GPRS (General Packet Radio Service) Support Node)/MME (Mobility Management Entity).

Figure 2:
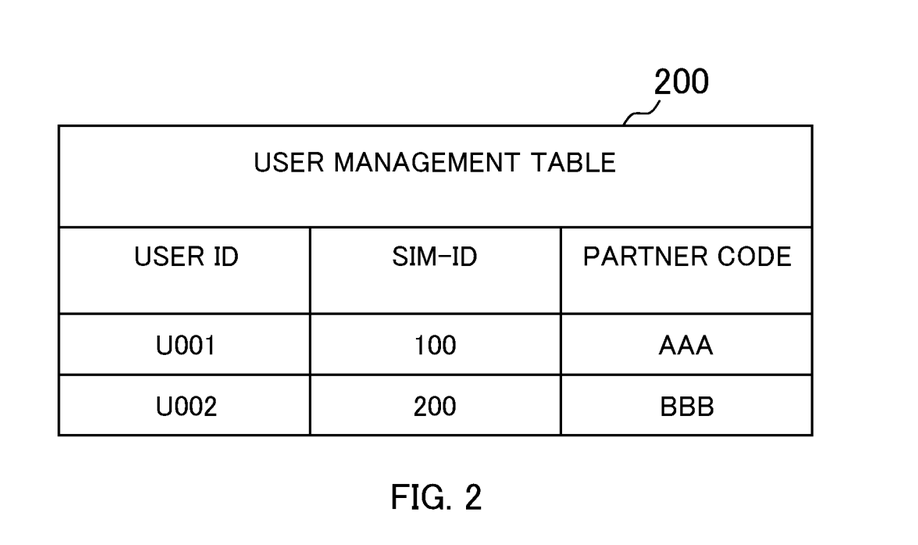
FIG. 2 illustrates an exemplary configuration of a user management table.

User management server 10 stores user management table 200 illustrated in FIG. 2, and manages a user identifier (referred to as "user ID" hereinafter), a SIM identifier (referred to as "SIM-ID" hereinafter), and a partner code in an associated manner. The user ID is an e-mail address, an account ID, or the like of a predetermined service, for example. The SIM-ID is an identifier of a prepaid SIM, and an example thereof may be ISMI (International Mobile Subscriber Identity), MSISDN (Mobile Subscriber Integrated Service Digital Network Number), or ICCID (Integrated Circuit Card ID). The partner code is a code assigned to each partner company by the communications carrier providing connection control system 1, for example.

Figure 3:
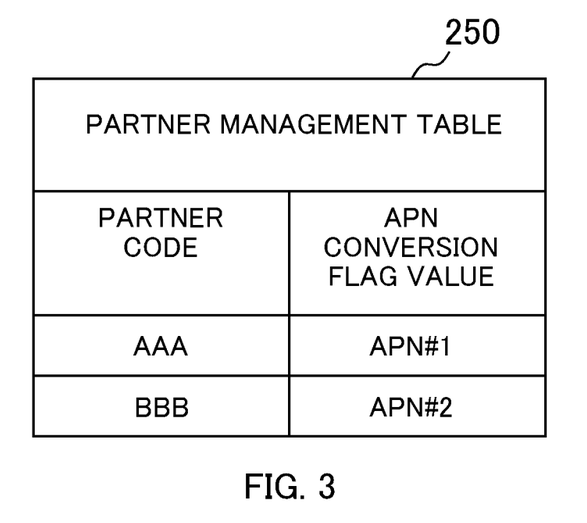
FIG. 3 illustrates an exemplary configuration of a partner management table.

Further, user management server 10 stores partner management table 250 illustrated in FIG. 3 and manages the partner code and an APN conversion flag value in an associated manner. The APN conversion flag value is a value indicating the APN after opening the line. The APN conversion flag value is a numerical value, a string, or a combination of those.

Further, user management server 10 includes use-state change detection section 120 and connection node control section 122 as its functions.

Use-state change detection section 120 detects the change in the use state of the SIM-ID based on information and the like inputted from line-opening processing server 14, and outputs a detection result to connection node control section 122. The change in the use state of the SIM-ID is a change from a state before the line-opening processing of the SIM-ID of the prepaid SIM is performed to a state where the line-opening processing is completed, for example.

Once use-state change detection section 120 detects a change in the use state of a predetermined SIM-ID, connection node control section 122 refers to user management table 200 and partner management table 250 to identify the APN conversion flag value corresponding to the SIM-ID whose use state is being changed. Then, connection node control section 122 transmits a changing instruction of the APN conversion flag value of the identified SIM-ID to SIM-ID management server 12. Note that the changing instruction includes the identified SIM-ID and the APN conversion flag value corresponding thereto.

Figure 4:
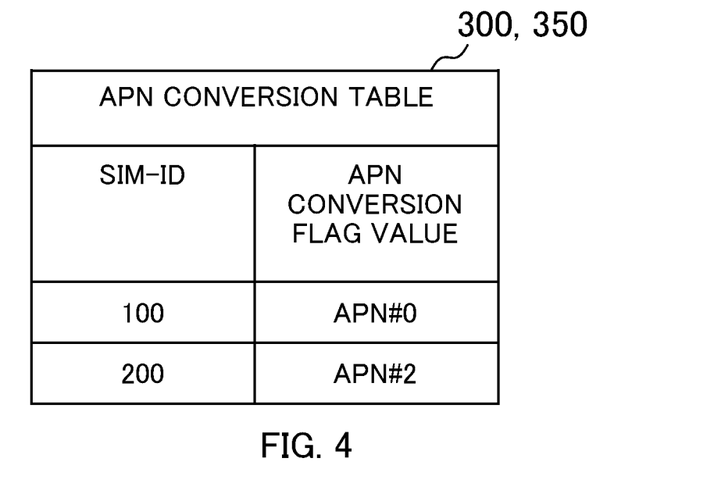
FIG. 4 illustrates an exemplary configuration of an APN conversion table.

SIM-ID management server 12 stores APN conversion table 300 illustrated in FIG. 4, and manages the SIM-ID and the APN conversion flag value in an associated manner. The APN conversion flag value corresponding to the SIM-ID before opening the line is "APN #0". Upon receipt of a changing instruction of the APN conversion flag value from user management server 10, SIM-ID management server 12 transmits the changing instruction to connection node 16 and also changes the APN conversion flag value of the SIM-ID included in the changing instruction in APN conversion table 300.

When user management server 10 and SIM-ID management server 12 are a single management server, connection node control section 122 of user management server 10 directly transmit the changing instruction to connection node 16.

Line-opening processing server 14 provides a service for performing the line-opening processing of the SIM-ID for which line-opening processing is not performed. For example, line-opening processing server 14 provides a WEB page for line-opening processing to terminal 20 having the prepaid SIM for which the line-opening processing of the SIM-ID is not performed. Further, line-opening processing server 14 performs the line-opening processing of the SIM-ID of the prepaid SIM for terminal 20 requesting to open the line, and notifies user management server 10 that the line-opening processing is completed.

Like SIM-ID management server 12, connection node 16 stores APN conversion table 350 illustrated in FIG. 4, and manages the SIM-ID and the APN conversion flag value in an associated manner. The APN conversion flag value corresponding to the SIM-ID of the prepaid SIM before opening the line is "APN #0". Upon receipt of a changing instruction from SIM-ID management server 12, connection node 16 changes the APN conversion flag value of the SIM-ID included in the changing instruction in APN conversion table 350. Upon receipt of a connection request including the SIM-ID from terminal 20, connection node 16 refers to APN conversion table 350, selects the APN to be the connection destination of terminal 20, and connects terminal 20 to the selected APN.

<Processing Flow>

Next, a processing flow in connection control system 1 will be described.

First, referring to a case of user with user ID "U001", a flow of processing from subscribing to the prepaid SIM to registering the SIM-ID to user management server 10 will be described with reference to FIG. 5, and FIG. 2 to FIG. 4.

Figure 5:
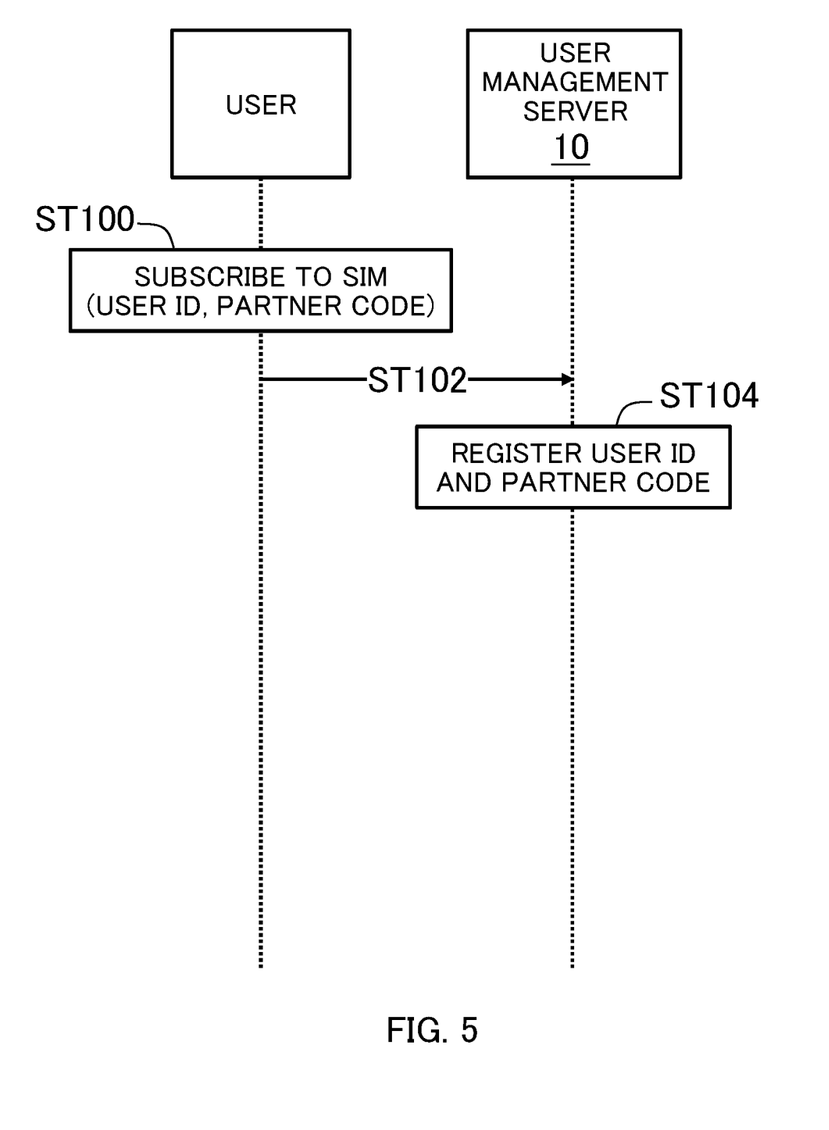
FIG. 5 illustrates a flowchart indicating a flow of processing from applying for use of a prepaid SIM to registering a SIM-ID.

The user subscribing to the prepaid SIM receives a partner code "AAA" from a partner company. Then, the user subscribes to the SIM for user management server 10 (communications carrier) (ST100). At this point, the user provides the user ID "U001" of the user oneself and the partner code "AAA" received from the partner company to user management server 10 (ST102).

User management server 10 associates and registers the user ID "U001" provided in ST102 and the partner code "AAA" to user management table 200 (ST104). With such processing, the user ID "U001" and the partner code "AAA" are associated in user management table 200. Note that the user ID and the SIM-ID are associated in ST218 described later.

Next, referring to the case of the user with user ID "U001", described is a flow of the processing from a point where the user receives the prepaid SIM to a point where terminal 20 is connected to the APN of the partner company from which a specific service can be received with reference to FIG. 6, and FIG. 2 to FIG. 4. Note, however, that the APN of the partner company is not limited to those proving the specific service but also those providing a regular service. Further, SIM-ID management server 12 and connection node 16 retain APN conversion tables 300 and 350 in a state where the SIM-ID and the APN conversion flag value "APN #0" before being registered are associated in advance by the communications carrier.

Figure 6:
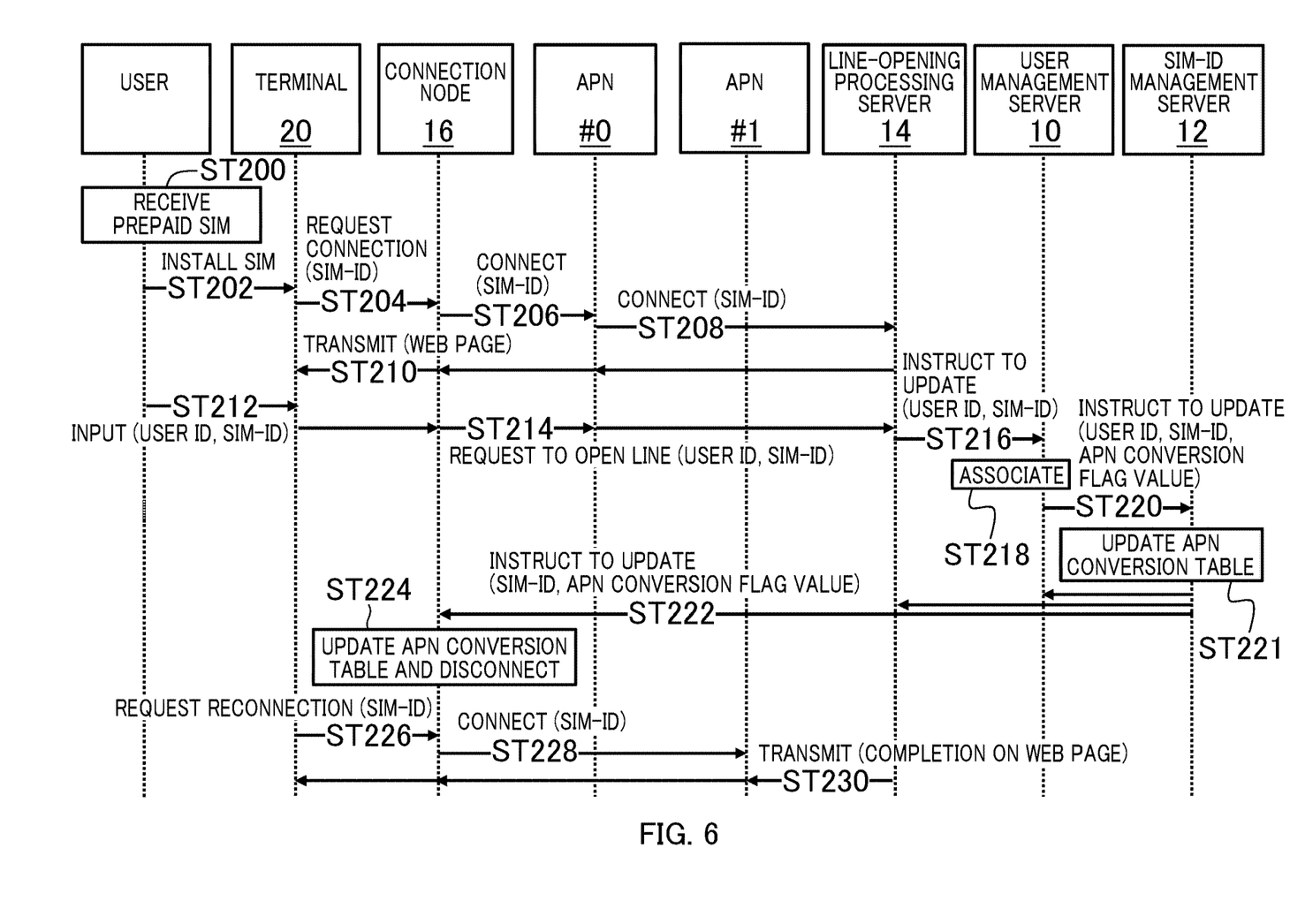
FIG. 6 illustrates a flowchart indicating a flow of processing from receiving the prepaid SIM to connecting to an APN.

The user receives the prepaid SIM subscribed in ST100 at a shop of the communications carrier (ST200). For example, when the user is a foreign user staying temporarily in Japan on a trip or the like, the user subscribes to the prepaid SIM through a WEB site in the user's own country and receives the subscribed prepaid SIM at a shop of the communications carrier upon arrival in Japan. Then, the user installs the prepaid SIM to terminal 20 such as a smartphone (ST202).

Terminal 20 transmits the connection request including the SIM-ID of the prepaid SIM to connection node 16 through an operation of the user (ST204).

Upon receiving the connection request of ST204, connection node 16 refers to APN conversion table 350 to check the APN conversion flag value associated with the SIM-ID "100" included in the connection request. The APN conversion flag value "APN #0" is associated with the SIM-ID "100", so that connection node 16 connects terminal 20 to APN #0 (ST206). APN #0 logically limits the access destination to line-opening processing server 14, so that terminal 20 is forcibly connected to line-opening processing server 14 (ST208). Connection node 16 transmits the connection request from terminal 20 to line-opening processing server 14 via APN #0.

Upon receiving the connection request from terminal 20, line-opening processing server 14 transmits the WEB page for line-opening processing to terminal 20 via APN #0 and connection node 16 (ST210). Upon receiving the WEB page in ST210, terminal 20 displays the WEB page on a screen of a display section and waits for an input from the user. The user inputs the user ID "U001" provided when subscribing to the prepaid SIM and the SIM-ID "100" of the prepaid SIM to the WEB page (ST212).

Terminal 20 transmits a line-opening request including the user ID "U001" and the SIM-ID "100" inputted in ST212 to line-opening processing server 14 via connection node 16 and APN #0 (ST214).

Upon receiving the line-opening request of ST214, line-opening processing server 14 transmits an update instruction related to opening of the line for opening the line of the SIM-ID "100" included in the line-connecting request to user management server 10 via communication network 8 (ST216). The user ID "U001" and the SIM-ID "100" are included in the update instruction related to opening of the line.

Upon receiving the update instruction related to opening of the line in ST216, user management server 10 identifies the user ID matching the user ID "U001" included in the update instruction from user management table 200 and determines whether or not the SIM-ID is associated with the identified user ID "U001". When the SIM-ID is not associated with the user ID "U001", user management server 10 associates the SIM-ID "100" included in the update instruction with the identified user ID "U001" in user management table 200 (ST218). With such processing, user management server 10 starts processing for changing the use state of the prepaid SIM provided to the user with the user ID "U001".

That is, user management server 10 identifies the APN as the connection destination of the SIM-ID "100". Specifically, user management server 10 refers to user management table 200, and identifies the partner code "AAA" that is associated with the user ID "U001". Further, user management server 10 refers to partner management table 250, and identifies the APN conversion flag value "APN #1" that is associated with the partner code "AAA". Then, user management server 10 transmits an update instruction of the APN conversion flag value to SIM-ID management server 12 (ST220). The user ID "U001", the SIM-ID "100", and the identified APN conversion flag value "APN #1" are included in the update instruction of the APN conversion flag value.

Upon receiving the update instruction in ST220, SIM-ID management server 12 changes APN conversion flag value to be associated with the SIM-ID "100" included in the update instruction from "APN #0" to "APN #1" in APN conversion table 300 (ST221).

Then, SIM-ID management server 12 transmits an update completion notification of APN conversion table 300 to user management server 10 and line-opening processing server 14. Further, SIM-ID management server 12 transmits an update instruction of the APN conversion flag value to connection node 16 (ST222). The SIM-ID "100" and the identified APN conversion flag value "APN #1" are included in the update instruction of the APN conversion flag value.

Upon receiving the instruction in ST222, connection node 16 changes the APN conversion flag value to be associated with the received SIM-ID "100" from "APN #0" to "APN #1" in APN conversion table 350. Further, connection node 16 disconnects the line with terminal 20 (ST224).

Upon detecting disconnection executed in ST224, terminal 20 transmits a connection request including the SIM-ID to connection node 16 to try to be re-connected (ST226).

Upon receiving the connection request transmitted in ST226, connection node 16 connects terminal 20 to APN #1 since the APN conversion flag value "APN #1" is associated with the received SIM-ID "100" in APN conversion table 350 (ST228). With such processing, the connection destination of terminal 20 is automatically switched from APN #0 to APN #1.

Further, upon receiving the update completion notification of APN conversion table 300 from SIM-ID management server 12, line-opening processing server 14 (or user management server 10) transmits the WEB page to terminal 20 indicating that the line-opening processing is completed via APN #1 and connection node 16 (ST230).

<Effects>

As described above, in the present embodiment, a configuration is employed in which connection control system 1 connects terminal 20 to APN #0 after terminal 20 is connected to the network until the line-opening processing of the prepaid SIM of terminal 20 is completed, and connects terminal 20 to the APN (APN #1 or the like) corresponding to the partner code after the line-opening processing of the prepaid SIM of terminal 20 is completed. With such structure, connection control system 1 can automatically switch the APN of the connection destination of the terminal being connected to the network in accordance with the change in the use state of the prepaid SIM.

<Partner Code and APN>

As described above, the partner code is a code assigned to the partner company. Further, a peculiar condition can be configured for the APN. For the partner code assigned to the partner company, the communications carrier associates the APN conversion flag value to the APN that has a peculiar condition desired by the partner company. For example, peculiar conditions as follows may be configured for the APN. Note that the peculiar condition may be configured in a combination of a plurality of configurations.

Configuration in which an advertisement of the partner company is delivered to the terminal connected to the APN.
   Configuration in which data communication amount between the terminal connected to the APN and the server of the partner company is not counted.
   Configuration in which an advertisement of the partner company is delivered to the terminal connected to the APN, data communication amount is given (that is, assigned) to the terminal (prepaid SIM) in accordance with the number of views of the advertisement.

Configuration in which limit set on the communication rate between the terminal connected to the APN and the server of the partner company is lifted.

Configuration in which the terminal connected to the APN is forcibly (or preferentially) connected to the server of the partner company.

As mentioned above, in the embodiment, the partner code is associated with the APN. Associating those makes it possible to implement a system that is advantageous for all of the communications carrier, the partner company, and the user.

That is, the communications carrier can request the partner company to advertise and publicize the prepaid SIM of the communication carrier itself to the users. Such advertisement and publicity increase the possibility for a greater number of users to use the communication network of the communications carrier itself. Especially, it is possible to advertise and publicize the prepaid SIM of the communications carrier itself to inbound users staying temporarily in Japan on a trip or the like via overseas partner companies.

The partner company can lead, to the service of the own company, the user who registers the partner code of the own company when using the prepaid SIM. For example, the partner company can deliver an advertisement of the own company to the user and allow the user to use the service of the own company preferentially.

<Modification of Change in Use State of Prepaid SIM>

In the above, as an example of the change in the use state of the prepaid SIM, described is a change in a state before opening the line of the SIM-ID to a state after opening the line. Other than that, there are also following cases (A1) to (A3) as examples of the change in the use state of the prepaid SIM.

(A1) Expiration of Prepaid SIM

Figure 7:
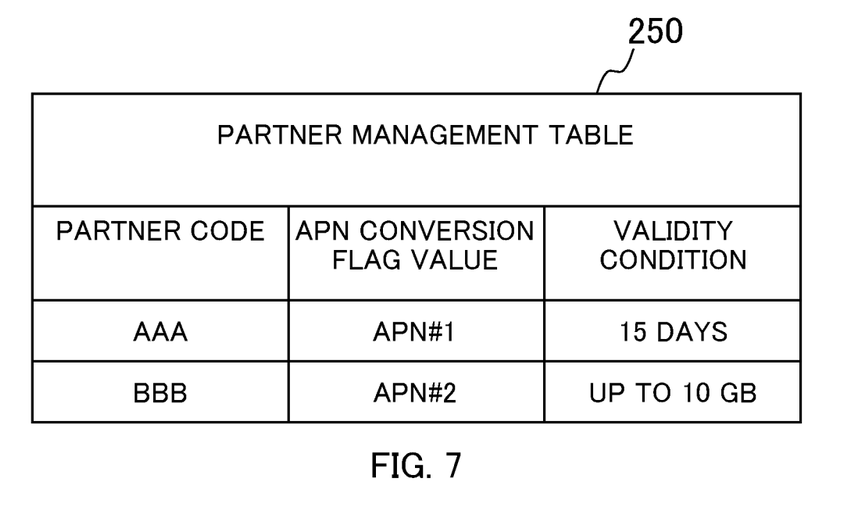
FIG. 7 illustrates an exemplary modification of the partner management table.

When the prepaid SIM is expired, the APN conversion flag value to be associated with the expired SIM-ID is changed to "APN#0" in APN conversion table 300. For example, as illustrated in FIG. 7, in partner management table 250, a validity condition is further associated with the partner code and the APN conversion flag value in partner management table 250. The validity condition is a condition for validating the APN conversion flag value corresponding to the partner code. Now, when a validity condition "15 days" is configured for the partner code "AAA", connection control system 1 performs following processing. That is, connection control system 1 validates connection to "APN #1" from the SIM-D "100" associated with the partner code "AAA" in user management table 200 until 15 days passes from the point where the line is opened, invalidates at the point after 15 days has passed, and changes the connection to "APN #0". With such processing, when the prepaid SIM becomes invalid, the connection destination of terminal 20 is automatically switched to line-opening processing server 14.

(A2) Change of Partner Code

Once the partner code associated with the user ID or the SIM-ID is changed, connection control system 1 changes the APN conversion flag value associated with the SIM-ID to the APN conversion flag value associated with the changed partner code in APN conversion tables 300 and 350. With such processing, once the partner code is changed, the APN as the connection destination of terminal 20 is automatically switched in accordance with the change of the partner code.

(A3) Use-Up of Data Communication Amount

When the used data communication amount reaches the upper limit of the data communication amount associated with the partner code, connection control system 1 changes the APN conversion flag value to be associated with the SIM-ID thereof to a predetermined (default) APN conversion flag value in APN conversion tables 300 and 350. For example, as illustrated in FIG. 7, when a validity condition "up to 10 GB" is configured for a partner code "BBB", connection control system 1 invalidates connection to APN #2 from the SIM-ID "100" to which the partner code "BBB" is associated in user management table 200 at the point where the data communication amount exceeds 10 GB, and changes connection to the APN indicated by the default APN conversion flag value. The predetermined APN conversion flag value may be "APN #0" or may be the default APN of the prepaid SIM. With such processing, the connection destination of terminal 20 is automatically switched to the default APN having no peculiar condition.

<Other Modifications>

For example, user management server 10 and SIM-ID management server 12 may be configured as a single management server. Further, the partner code is not limited to a case of being issued from the communications carrier but may be issued by a predetermined third-party organization. Also, a plurality of partner codes may be assigned to a single partner company. Further, the SIM is not limited to the prepaid SIM but may also be other SIMs such as a postpaid SIM and the like.

<Hardware Configuration>

Note that the block diagrams used to describe the embodiments illustrate blocks on the basis of functions. These functional blocks (constituent sections) are implemented by any combination of hardware and/or software. A means for implementing the functional blocks is not particularly limited. That is, the functional blocks may be implemented by one physically and/or logically coupled apparatus. Two or more physically and/or logically separated apparatuses may be directly and/or indirectly (for example, via wires and/or wirelessly) connected, and the plurality of apparatuses may implement the functional blocks.

Figure 8:
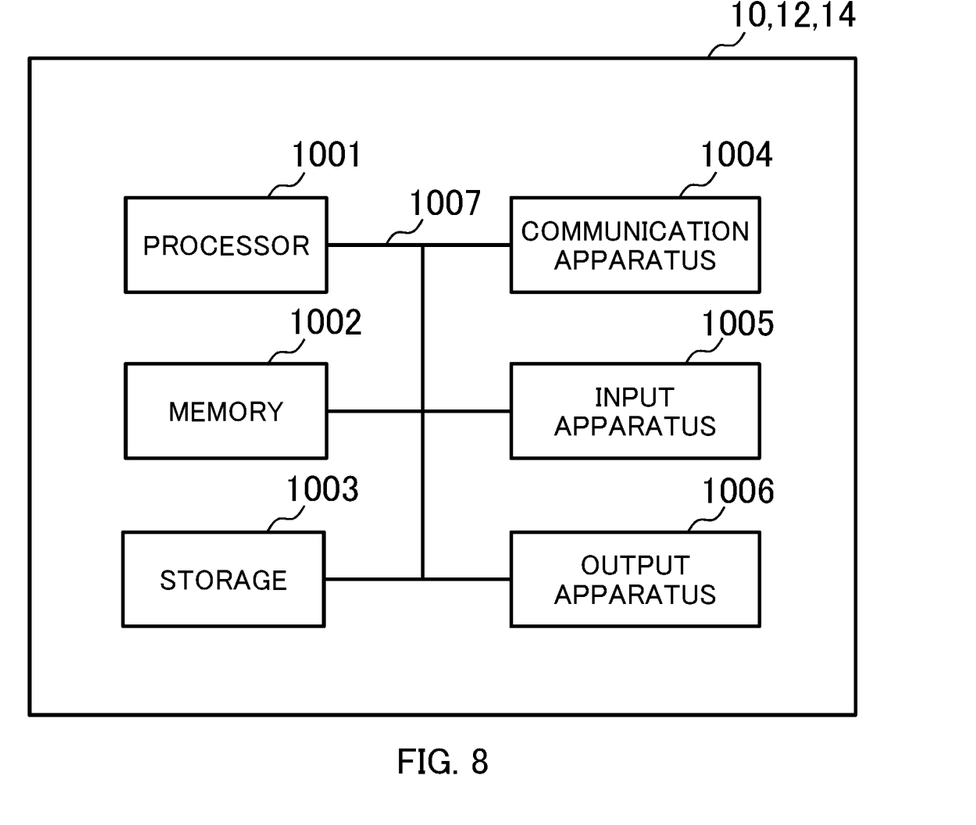
FIG. 8 illustrates an exemplary hardware configuration of a server and a terminal according to the present invention.

For example, the server, the terminal, and the like according to an embodiment of the present invention may function as a computer that executes communication processing of the present invention. FIG. 8 illustrates an example of a hardware configuration of the server and the terminal according to an embodiment of the present invention. Servers 10, 12 and 14, and terminal 20 as described above may be physically constituted as a computer apparatus including processor 1001, memory 1002, storage 1003, communication apparatus 1004, input apparatus 1005, output apparatus 1006, bus 1007, and the like.

Note that the term "apparatus" in the following description can be replaced with a circuit, a device, a unit, or the like. The hardware configurations of servers 10, 12 and 14, and of terminal 20 may include one apparatus or a plurality of apparatuses illustrated in the drawings or may not include part of the apparatuses.

The functions in servers 10, 12 and 14, and terminal 20 are implemented by predetermined software (program) loaded into hardware, such as processor 1001, memory 1002, and the like, according to which processor 1001 performs the arithmetic and controls communication performed by communication apparatus 1004 or reading and/or writing of data in memory 1002 and storage 1003.

Processor 1001 operates an operating system to entirely control the computer, for example. Processor 1001 may be composed of a central processing unit (CPU) including an interface with peripheral apparatuses, control apparatus, arithmetic apparatus, register, and the like. For example, use-state change detection section 120, connection node control section 122, and the like as described above may be implemented by processor 1001.

Processor 1001 reads out a program (program code), a software module, or data from storage 1003 and/or communication apparatus 1004 to memory 1002 and executes various types of processing according to the read-out program or the like. The program used is a program for causing the computer to execute at least part of the operation described in the embodiments. For example, connection node control section 122 of user management server 10 may be implemented by a control program stored in memory 1002 and operated by processor 1001, and the other functional blocks may also be implemented in the same way. While it has been described that the various types of processing as described above are executed by one processor 1001, the various types of processing may be executed by two or more processors 1001 at the same time or in succession. Processor 1001 may be implemented by one or more chips. Note that the program may be transmitted from a network through a telecommunication line.

Memory 1002 is a computer-readable recording medium and may be composed of, for example, at least one of a ROM (Read Only Memory), an EPROM (Erasable Programmable ROM), an EEPROM (Electrically Erasable Programmable ROM), and a RAM (Random Access Memory). Memory 1002 may be called a register, a cache, a main memory (main storage apparatus), or the like. Memory 1002 can save a program (program code), a software module, and the like that can be executed to carry out the radio communication method according to an embodiment of the present invention.

Storage 1003 is a computer-readable recording medium and may be composed of, for example, at least one of an optical disk such as a CD-ROM (Compact Disc ROM), a hard disk drive, a flexible disk, a magneto-optical disk (for example, a compact disc, a digital versatile disc, or a Blue-ray (registered trademark) disc), a smart card, a flash memory (for example, a card, a stick, or a key drive), a floppy (registered trademark) disk, and a magnetic strip. Storage 1003 may also be called an auxiliary storage apparatus. The storage medium as described above may be a database, server, or other appropriate media including memory 1002 and/or storage 1003.

Communication apparatus 1004 is hardware (transmission and reception device) for communication between computers through a wired and/or wireless network and is also called, for example, a network device, a network controller, a network card, or a communication module.

Input apparatus 1005 is an input device (for example, a keyboard, a mouse, a microphone, a switch, a button, or a sensor) that receives input from the outside. Output apparatus 1006 is an output device (for example, a display, a speaker, or an LED lamp) which outputs to the outside. Note that input apparatus 1005 and output apparatus 1006 may be integrated (for example, a touch panel).

The apparatuses, such as processor 1001 and memory 1002, are connected by bus 1007 for communication of information. Bus 1007 may be composed of a single bus or by buses different among the apparatuses.

Furthermore, servers 10, 12 and 14, and terminal 20 may include hardware, such as a microprocessor, a digital signal processor (DSP), an Application Specific Integrated Circuit (ASIC), a Programmable Logic Device (PLD), and a Field Programmable Gate Array (FPGA), and the hardware may implement part or all of the functional blocks. For example, processor 1001 may be implemented by at least one of these pieces of hardware.

<Processing Procedure and the Like>

The orders of the processing procedures, the sequences, the flow charts, and the like of the aspects and embodiments described in the present specification may be changed as long as there is no contradiction. For example, elements of various steps are presented in exemplary orders in the methods described in the present specification, and the methods are not limited to the presented specific orders.

<Direction of Input and Output>

The information and the like can be output from a higher layer (or a lower layer) to a lower layer (or a higher layer). The information, the signals, and the like may be input and output through a plurality of network nodes.

<Handling of Input and Output Information and the Like>

The input and output information and the like may be saved in a specific place (for example, memory) or may be managed by a management table. The input and output information and the like can be overwritten, updated, or additionally written. The output information and the like may be deleted. The input information and the like may be transmitted to another apparatus.

<Determination Method>

The determination may be made based on a value expressed by one bit (0 or 1), based on a Boolean value (true or false), or based on comparison with a numerical value (for example, comparison with a predetermined value).

<Variations of Aspects>

The aspects and embodiments described in the present specification may be independently used, may be used in combination, or may be switched and used along the execution. Furthermore, notification of predetermined information (for example, notification indicating "it is X") is not limited to be performed explicitly but may also be performed implicitly (for example, by not notifying the predetermined information).

<Software>

Regardless of whether the software is called software, firmware, middleware, a microcode, or a hardware description language or by another name, the software should be broadly interpreted to mean an instruction, an instruction set, a code, a code segment, a program code, a program, a subprogram, a software module, an application, a software application, a software package, a routine, a subroutine, an object, an executable file, an execution thread, a procedure, a function, and the like.

The software, the instruction, and the like may be transmitted and received through a transmission medium. For example, when the software is transmitted from a website, a server, or another remote source by using a wired technique, such as a coaxial cable, an optical fiber cable, a twisted pair, and a digital subscriber line (DSL), and/or a wireless technique, such as an infrared ray, a radio wave, and a microwave, the wired technique and/or the wireless technique is included in the definition of the transmission medium.

<Terms>

The terms "system" and "network" used in the present specification can be interchangeably used.

The terms "connected" and "coupled" as well as any modifications of the terms mean any direct or indirect connection and coupling between two or more elements, and the terms can include cases in which one or more intermediate elements exist between two "connected" or "coupled" elements. The coupling or the connection between elements may be physical or logical coupling or connection or may be a combination of physical and logical coupling or connection. When the terms are used in the present specification, two elements can be considered to be "connected" or "coupled" to each other by using one or more electrical wires, cables, and/or printed electrical connections or by using electromagnetic energy, such as electromagnetic energy with a wavelength of a radio frequency domain, a microwave domain, or an optical (both visible and invisible) domain that are non-limiting and non-inclusive examples.

The description "based on" used in the present specification does not mean "based only on," unless otherwise specifically stated. In other words, the description "based on" means both of "based only on" and "based at least on."

Reference made to any elements named by using "first", "second", and the like in the present specification is not intended to limit the amount or the order of those elements as a whole. Such naming may be used in the present specification as a convenient way to distinguish two or more elements. Therefore, it is to be noted that reference made to the first and second elements does not mean that only the two elements can be employed therein or that the first element needs to precede the second element in any ways.

The "means" in the configuration of each apparatus may be replaced with "section," "circuit," "device," or the like.

The terms "including," "comprising," and modifications of these terms are intended to be inclusive just like the term "having," as long as the terms are used in the present specification or the appended claims. Furthermore, the term "or" used in the present specification or the appended claims is not intended to be an exclusive or.

When articles, such as "a," "an," and "the" in English, are added by translation in the entire disclosure, the articles include plural forms unless otherwise clearly indicated by the context.

While the present invention has been described in detail, it is obvious to those skilled in the art that the present invention is not limited to the embodiments described in the present specification. Modifications and variations of the aspects of the present invention can be made without departing from the spirit and the scope of the present invention defined by the description of the appended claims. Therefore, the description of the present specification is intended for exemplary description and does not limit the present invention in any sense.

The present patent application claims the benefit of priority based on Japanese Patent Application No. 2017-065871 filed on Mar. 29, 2017, and the entire content of Japanese Patent Application No. 2017-065871 is hereby incorporated by reference.

REFERENCE SIGNS LIST

10 User Management Server
12 SIM-ID Management Server
14 Line-Opening Processing Server
16 Connection Node
20 Terminal
120 Use-State Change Detection Section
122 Connection Node Control Section
200 User Management Table
250 Partner Management Table
300, 350 APN Conversion Table

The invention claimed is:

1. A connection control system, comprising:
a connection node configured to connect, upon receipt of a connection request including an identifier of a SIM (Subscriber Identity Module) from a terminal, the terminal to an APN (Access Point Name) as a connection destination associated with the identifier of the SIM; and
a management server configured to change the APN as the connection destination associated with the identifier of the SIM in accordance with a change in a use state of the SIM, and deliver an association between the identifier of the SIM and the APN as the connection destination to the connection node, wherein
the use state of the SIM changes in accordance with a state of a line of the identifier of the SIM,
the connection control system further comprises a line-opening processing server configured to perform line-opening processing for the identifier of the SIM for which the line-opening processing is not performed,
the connection node transmits a connection request including the identifier of the SIM for which the line-opening processing is not performed to a specific APN connected to the line-opening processing server, and
in a case where the line-opening processing of the identifier of the SIM is performed, the management server changes the connection destination associated with the identifier of the SIM to an APN other than the specific APN, and delivers an association between the identifier of the SIM and the changed APN of the connection destination.

2. The connection control system according to claim 1, wherein
the connection node disconnects connection from the terminal related to the identifier of the SIM, when changing the association between the identifier of the SIM and the APN as the connection destination managed by the connection node itself in accordance with the association between the identifier of the SIM and the changed APN as the connection destination delivered from the management server.

3. The connection control system according to claim 1, wherein:
the use state of the SIM changes in accordance with a state of expiration of the identifier of the SIM; and
when the identifier of the SIM expires, the management server changes the connection destination to be associated with the identifier of the SIM to the specific APN connected to the line-opening processing server.

4. The connection control system according to claim 1, wherein:
the management server manages the association between the identifier of the SIM and a partner code as well as the association between the partner code and the APN as the connection destination; and
the management server changes the connection destination to be associated with the identifier of the SIM to the APN of the partner code associated with the identifier of the SIM, in a case where the line-opening processing of the identifier of the SIM is performed.

5. The connection control system according to claim 4, wherein:
the use state of the SIM changes in accordance with a state of a validity condition of the partner code; and
the management server changes the APN of the partner code associated with the identifier of the SIM to another APN, when the validity condition of the partner code becomes unsatisfied.

6. The connection control system according to claim 4, wherein:
the use state of the SIM changes in accordance with a state of the association of the partner code; and
in a case where the partner code associated with the identifier of the SIM is changed, the management server changes the APN of the partner code before being changed and associated with the identifier of the SIM to the APN of the changed partner code.

7. The connection control system according to claim 4, wherein:
the management server delivers an advertisement associated with the partner code to the terminal related to the identifier of the SIM connected to the changed APN; and
the management server assigns a useable data communication amount to the identifier of the SIM in accordance with the number of views of the delivered advertisement.

8. A management server managing an association between an identifier of a SIM (Subscriber Identity Module) and an APN (Access Point Name), the management server comprising:
a use-state change detection section configured to detect a change in a use state of the SIM; and
a connection node control section configured to change the APN as a connection destination to be associated with the identifier of the SIM and delivers an association between the identifier of the SIM and the APN as the connection destination to a connection node, in a case where the use state of the SIM changes, wherein
the use state of the SIM changes in accordance with a state of a line of the identifier of the SIM, and
in a case where a line-opening processing server performs line-opening processing for the identifier of the SIM for which the line-opening processing is not performed based on transmitting, by the connection node, a connection request including the identifier of the SIM for which the line-opening processing is not performed to a specific APN connected to the line-opening processing server, the connection node control section changes the connection destination associated with the identifier of the SIM to an APN other than the specific APN, and delivers an association between the identifier of the SIM and the changed APN of the connection destination.

9. A connection control method controlling an APN (Access Point Name) as a connection destination of a terminal, the connection control method comprising:
in a case where a connection node receives, from the terminal, a first connection request including an identifier of a SIM (Subscriber Identity Module) for which line-opening processing is not performed, connecting to a specific APN connected to a line-opening processing server and transmitting the first connection request to the line-opening processing server via the specific APN;
notifying an update instruction including the identifier of the SIM to a management server from the line-opening processing server;
changing the connection destination to be associated with the identifier of the SIM included in the update instruction to an APN other than the specific APN, by the management server;
delivering the association between the identifier of the SIM and the changed APN as the connection destination to the connection node, by the management server;
changing, by the connection node, the association between the identifier of the SIM and the APN as the connection destination managed by the connection node itself in accordance with the association between the identifier of the SIM and the changed APN as the connection destination delivered from the management server;
disconnecting connection once from the terminal related to the identifier of the SIM; and
connecting the terminal to the changed APN as the connection destination associated with the identifier of the SIM, upon receipt of a second connection request including the identifier of the SIM from the terminal.

* * * * *